United States Patent [19]

Lu

[11] Patent Number: 5,580,368

[45] Date of Patent: Dec. 3, 1996

[54] EXHAUST GAS CLEANING DEVICE

[75] Inventor: Shui T. Lu, Taipei, Taiwan

[73] Assignee: Su-Ying R. Lu, Mt. Prospect, Ill.

[21] Appl. No.: 392,450

[22] Filed: Feb. 22, 1995

[51] Int. Cl.$^6$ .................................................. B03C 3/74
[52] U.S. Cl. .......................... 96/51; 55/279; 55/DIG. 38; 95/76; 96/55
[58] Field of Search .............................. 96/51, 55; 95/76; 55/279, DIG. 38

[56] References Cited

U.S. PATENT DOCUMENTS

| 470,608 | 3/1892 | Wardhaugh | 96/51 |
| 1,349,362 | 8/1920 | Chubb | 95/76 |
| 3,114,877 | 12/1963 | Dunham | 55/DIG. 38 |
| 3,492,790 | 2/1970 | Ebert | 55/DIG. 38 |
| 3,744,218 | 7/1973 | Ebert | 55/DIG. 38 |
| 3,785,126 | 1/1974 | Smitherman | 55/228 |
| 3,793,807 | 2/1974 | Prem Das | 55/223 X |
| 3,885,929 | 5/1975 | Lyon et al. | 55/223 X |
| 3,929,436 | 12/1975 | Kim et al. | 96/51 |
| 4,976,752 | 12/1990 | Torok et al. | 96/55 X |
| 5,429,669 | 7/1995 | Chang | 96/51 |

FOREIGN PATENT DOCUMENTS

| 184603 | 7/1966 | U.S.S.R. | 96/51 |
| 581971 | 12/1977 | U.S.S.R. | 96/51 |
| 795603 | 5/1958 | United Kingdom | 96/51 |

Primary Examiner—Richard L. Chiesa
Attorney, Agent, or Firm—Pro-Techtor International

[57] ABSTRACT

An exhaust gas cleaning device is provided, which is simple in structure and offers good performance in the cleaning of exhaust gas from car engines. The cleaning device includes a conductive cylindrical body through which the exhaust gas passes. A shaft is installed at the center of the conductive cylindrical body. A set of blades is provided on the shaft acting as a fan for sucking the exhaust gas in and out of the conductive cylindrical body. A scraping knife is provided also on the shaft. A static-electric generator having one pole connected to the cylindrical body and the other pole connected to the shaft is used to create an electric field between the cylindrical body and the shaft that ionizes smoke particles in the exhaust gas and deposits them on the inner wall of the cylindrical body. A collecting chamber is provided in communication with the inside of the cylindrical body for collecting deposition of smoke particles scraped by the scraping knife off the inner wall of the cylindrical body.

12 Claims, 11 Drawing Sheets 5,580,368

1

EXHAUST GAS CLEANING DEVICE

BACKGROUND OF THE INVENTION

1. Field of the Invention

The present invention relates to environmental protection devices, and more particularly to device for cleaning exhaust gas emitted from car engines.

2. Description of Prior Art

Exhaust gas from car engines contributes greatly to the air pollution. A number of exhaust gas cleaning devices have been thus proposed. Among them are U.S. Pat. No. 3,785, 126 "Pollution Control Apparatus for Smoke Emitter" to Smitherman; U.S. Pat. No. 3,793,807 "Automotive Engine Exhaust Purifier" to Poem Das; and U.S. Pat. No. 3,885,929 "Method and Apparatus for Cleaning Exhaust Gas" to Lyon et al.

These prior art devices have good performance in cleaning exhaust gas. However, the structure is complex. There exists a need for an exhaust gas cleaning device which is simple in structure yet nonetheless provides good gas cleaning performance.

SUMMARY OF THE INVENTION

It is therefore a primary objective of the present invention to provide an exhaust gas cleaning device which is simple in structure and provides good gas cleaning performance.

In accordance with the foregoing and other objectives of the present invention, an exhaust gas cleaning device is provided. The cleaning device includes a conductive cylindrical body through which the exhaust gas passes. A shaft is installed at the center of the conductive cylindrical body. A set of blades is provided on the shaft acting as a fan for sucking the exhaust gas in and out of the conductive cylindrical body. A scraping knife is provided also on the shaft. A static-electric generator having one pole connected to the cylindrical body and the other pole connected to the shaft is used to create an electric field between the cylindrical body and the shaft that ionizes smoke particles in the exhaust gas and deposits them on the inner wall of the cylindrical body. A collecting chamber is provided in communication with the inside of the cylindrical body for collecting deposition of smoke particles scraped by the scraping knife off the inner wall of the cylindrical body.

BRIEF DESCRIPTION OF THE DRAWINGS

The present invention can be more fully understood by reading the subsequent detailed description of the preferred embodiments thereof with references made to the accompanying drawings, wherein.

2

Figure 7A:
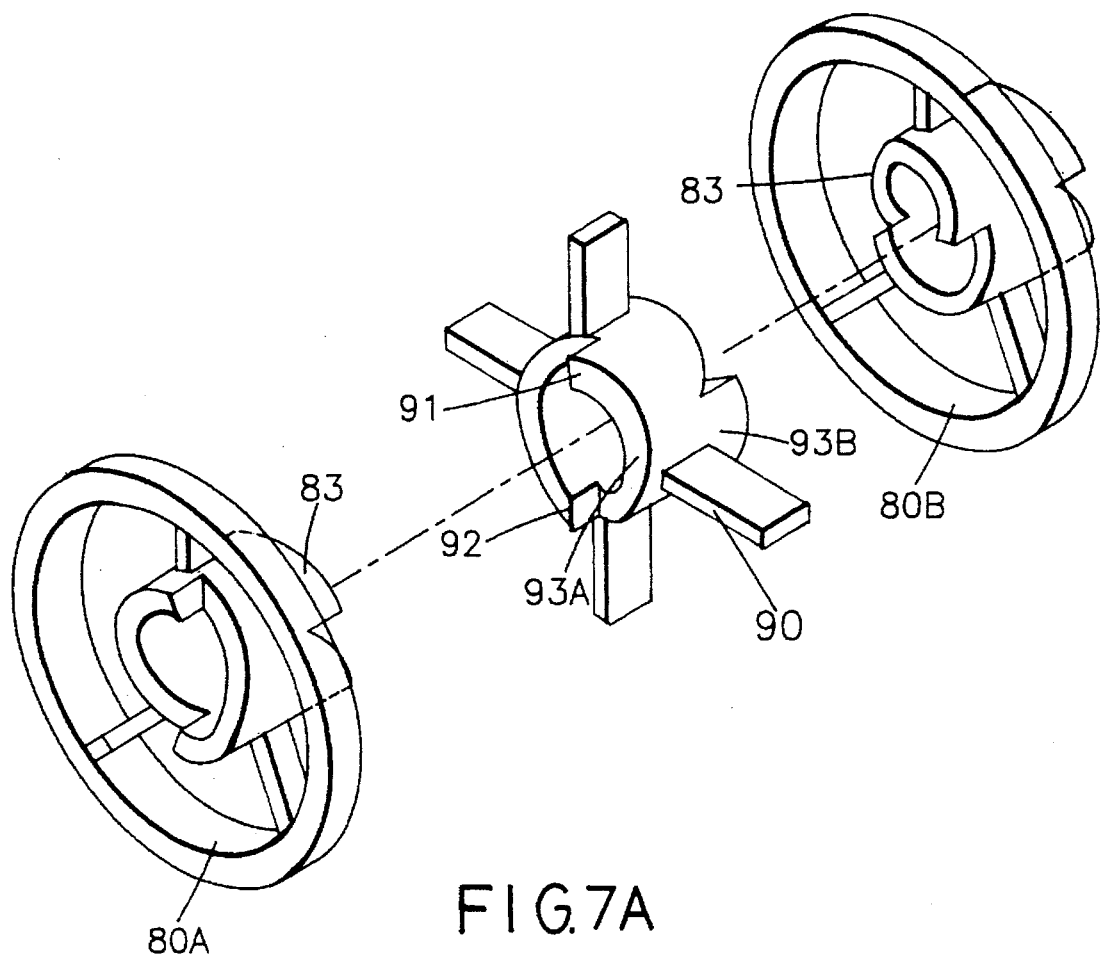
Figure 7B:
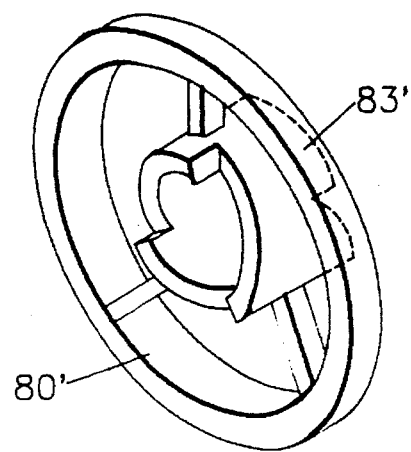
Figure 8:
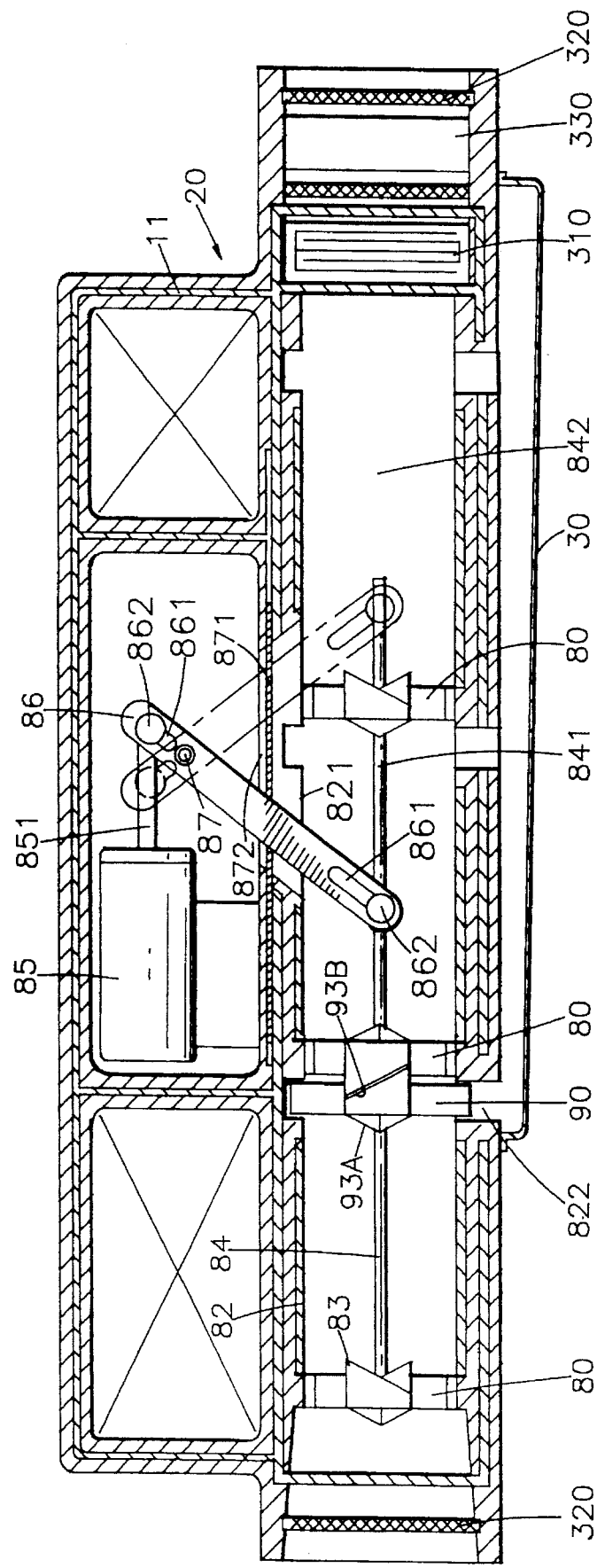
Figure 9:
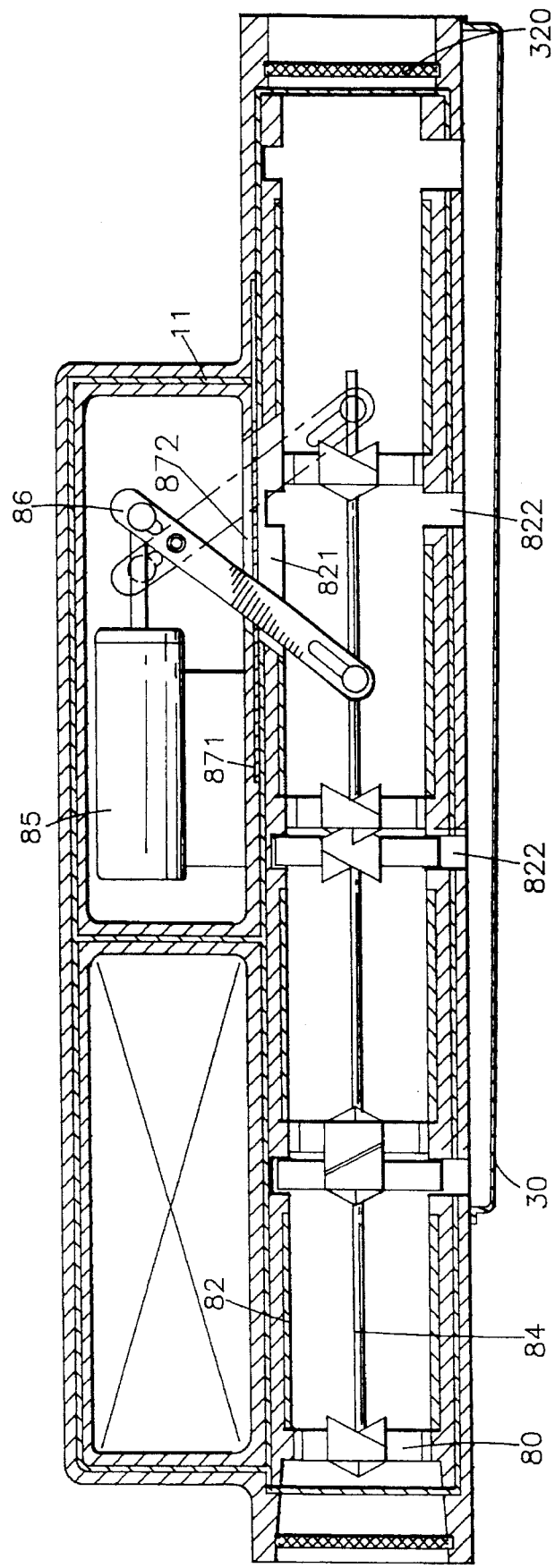
Figure 10C:
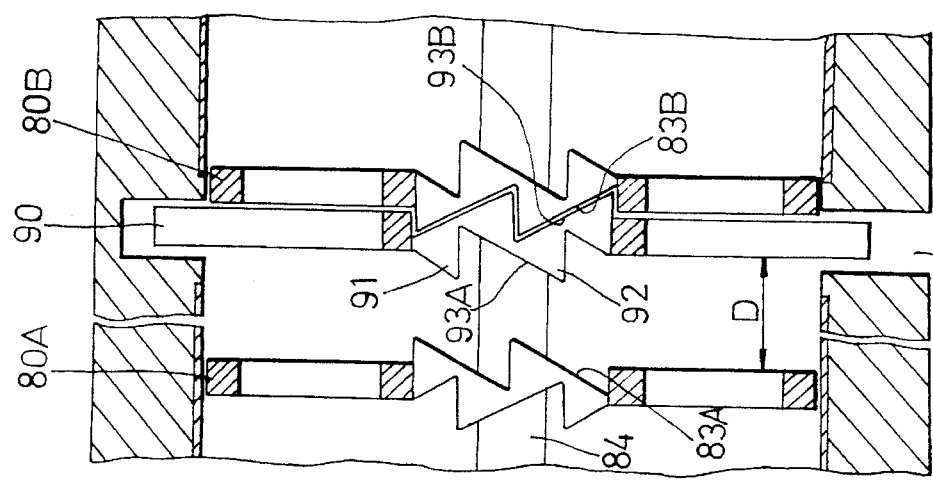
Figure 10B:
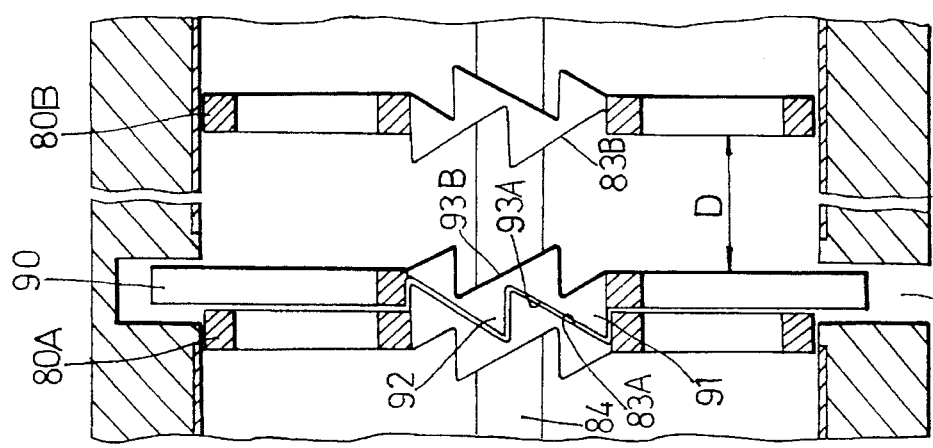
Figure 10A:
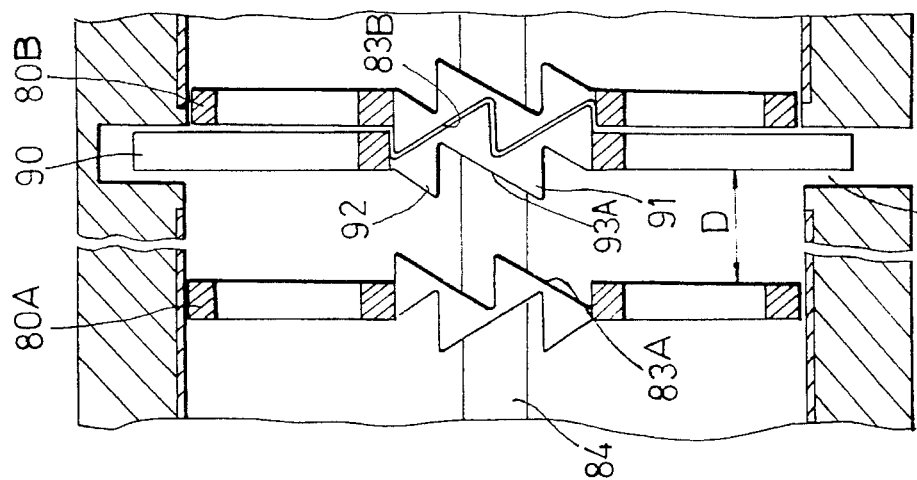
Figure 11:
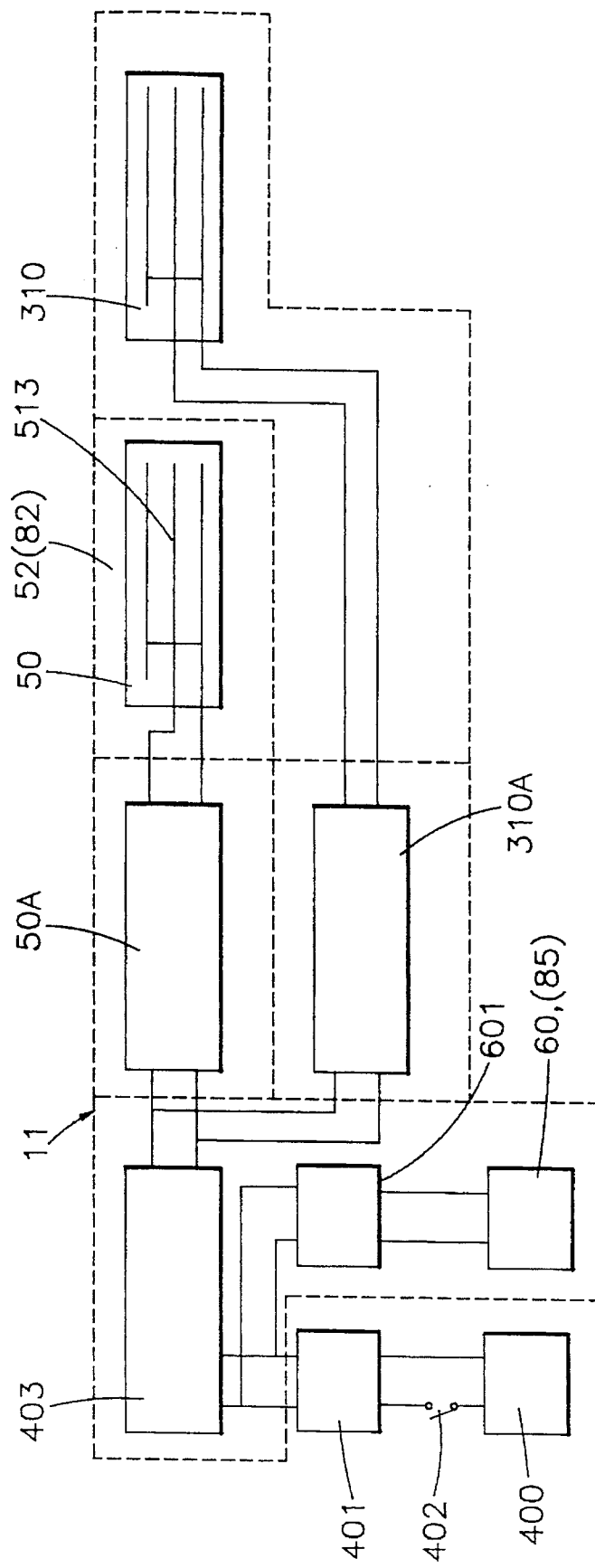
Figure 12:
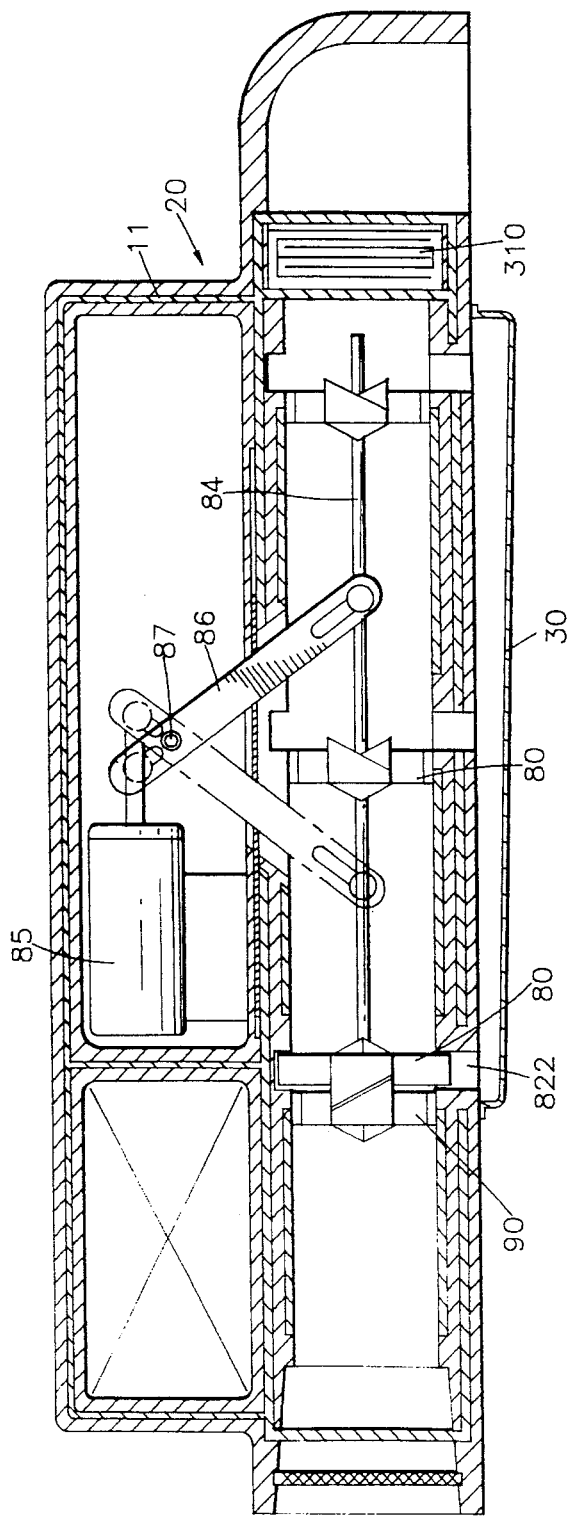
Figure 13:
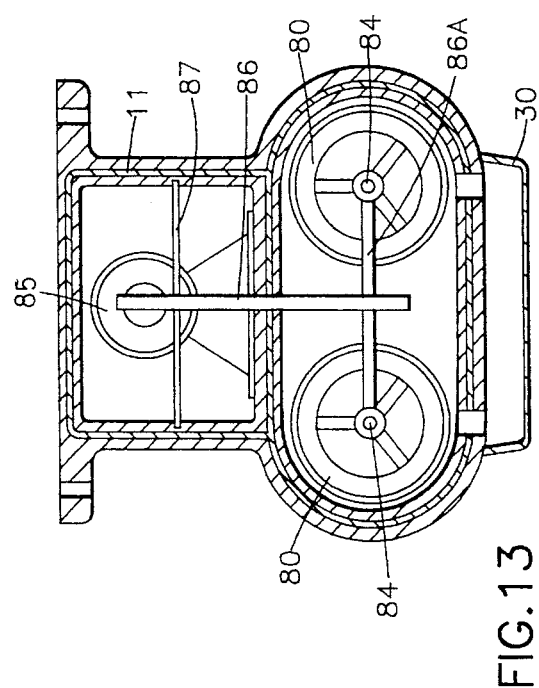
Figure 14:
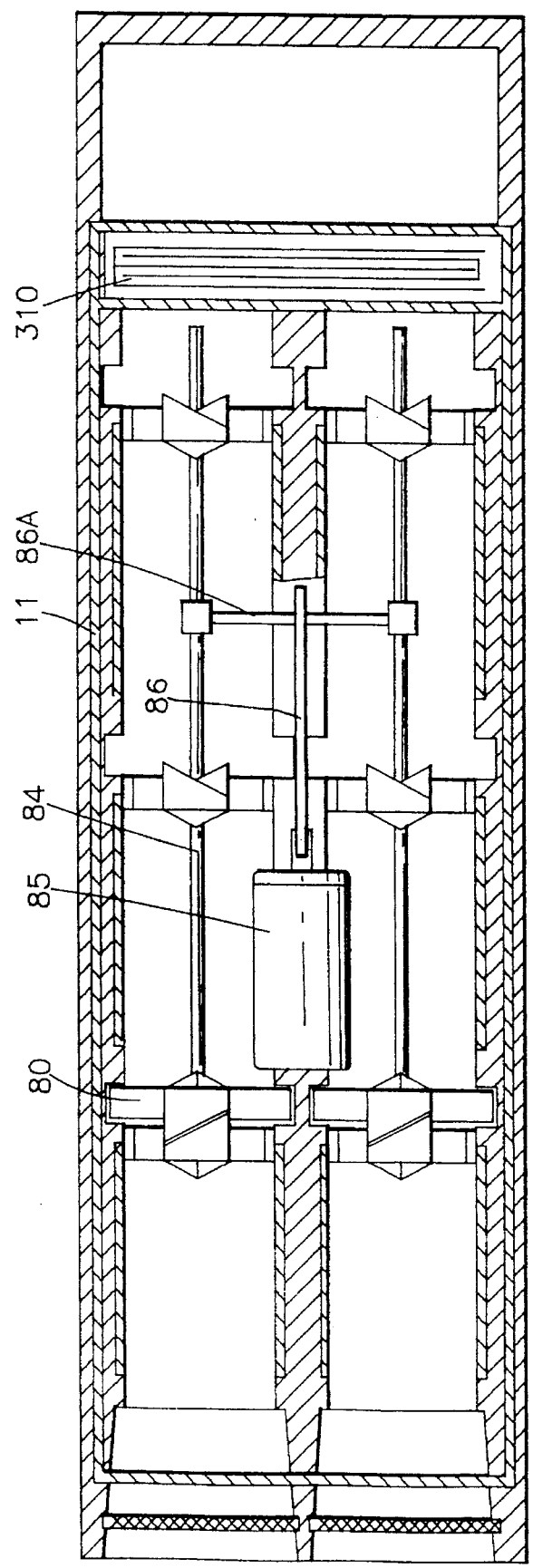

FIG. 7A shows an exploded perspective view of a reciprocating cleaning unit employed in the exhaust gas cleaning device according to the second embodiment of the present invention;

FIG. 7B shows another embodiment of the reciprocating cleaning unit;

FIG. 8 is a longitudinal view showing the second preferred embodiment of an exhaust gas cleaning device according to the present invention;

FIG. 9 is a longitudinal view showing the third preferred embodiment of an exhaust gas cleaning device according to the present invention;

FIGS. 10A–10C are schematic drawings used to explain the gas cleaning operation going on in the exhaust gas cleaning device according to the present invention;

FIG. 11 is a circuit block diagram showing the electrical system employed in the exhaust gas cleaning device according to the present invention;

FIG. 12 is a side view of the fourth preferred embodiment of the present invention;

FIG. 13 is a cross-sectional view of the fourth preferred embodiment of the present invention; and FIG. 14 is a longitudinal-sectional view (from the top) of the fifth preferred embodiment of the present invention.

DETAILED DESCRIPTION OF THE PREFERRED EMBODIMENTS

FIG. 11 shows a block diagram of an exhaust gas cleaning device according to the present invention, which includes a DC power source 400, an overload protector 401, a voltage booster 403, a static-electricity generator 50A, a gas cleaning device 50, a deodorzing device 310, and an ion generator 310A. The other elements include a switch 402, a timer 601, and a motor 60 (or which can be a solenoid 85).

Figure 1:
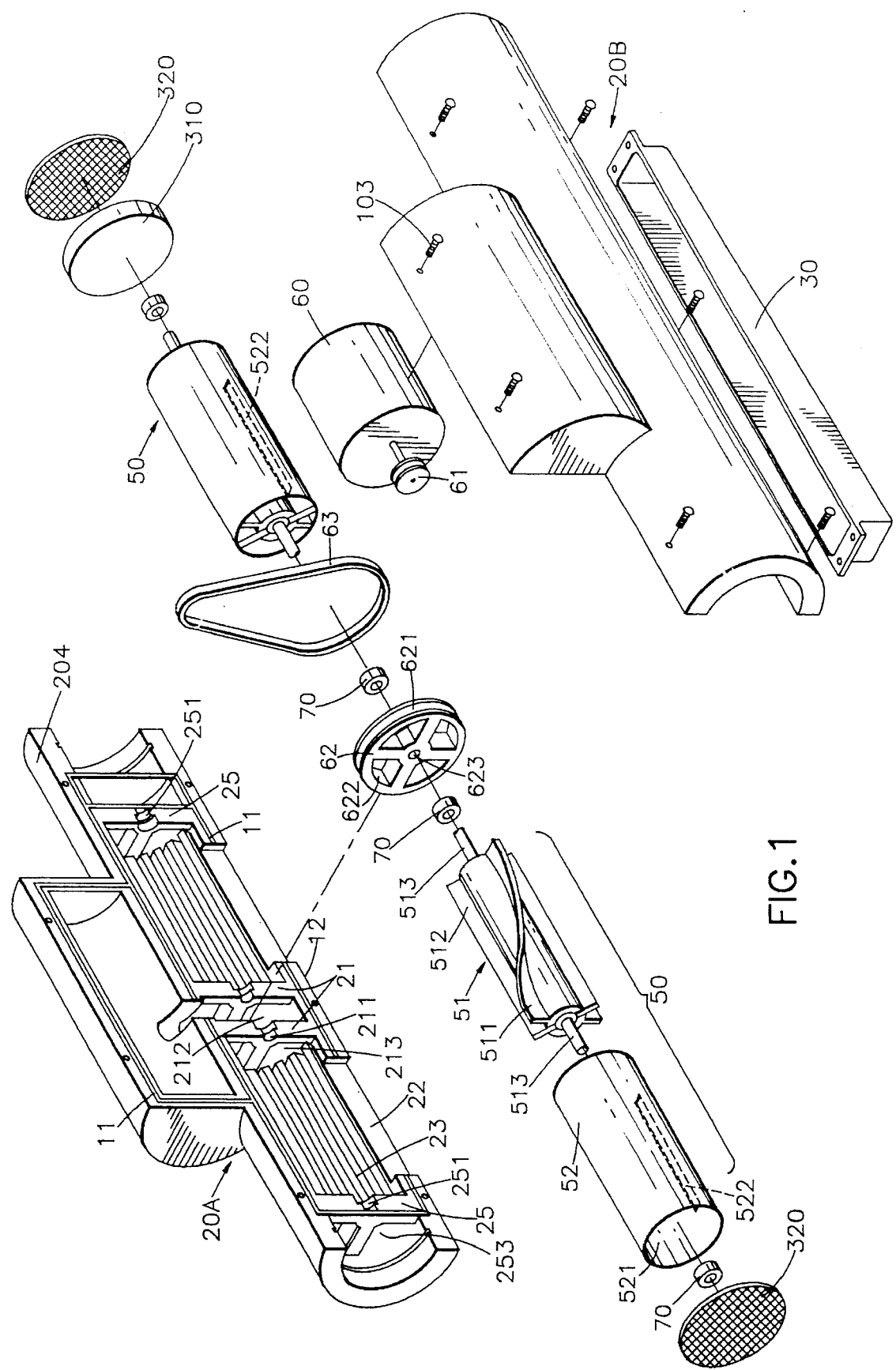
FIG. 1 shows a perspective view of an exhaust gas cleaning device according to the first embodiment of the present invention.

Referring to FIG. 1, the body of the exhaust gas cleaning device includes a first half part 20A at the left and a second half part 20B at the right. The motor 60, which drives a pulley 61, is accommodated in a top portion of the body, and the gas cleaning device 50 and the odor-removing device are accommodated in the bottom. A shield 11 for isolating static-electricity is provided inside the casing 20 and connected to the ground. An insulating member 12 is provided at the outside of the shield 11 to prevent leakage of the static-electricity. Two pairs of bearing supports 21, 25 are provided inside the body 20. A large pulley 62 is provided in a room 212 between the two bearing supports 21. A belt 63 is used to transmit the driving power from the motor 60 via the small pulley 61 to the large pulley 62. The openings 211,251 on the bearing supports 21, 25 are used to support two pairs of bearings. Vents 213, 253 are provided on the bearing supports 21, which are connected with gas draining passage 22 and a plurality of heat-dissipating members 23. A collecting chamber 30 is in connection with the draining passage 22 is provided at the bottom of the casing 20. If necessary, the rear end of the exhaust gas cleaning device 50 can be provided with a deodorizing device 310 and the front and rear ends of the bottom casing 20 can be each provided with a protective screen 320 to protect the inner structure of the exhaust gas cleaning device 50.

Figure 2:
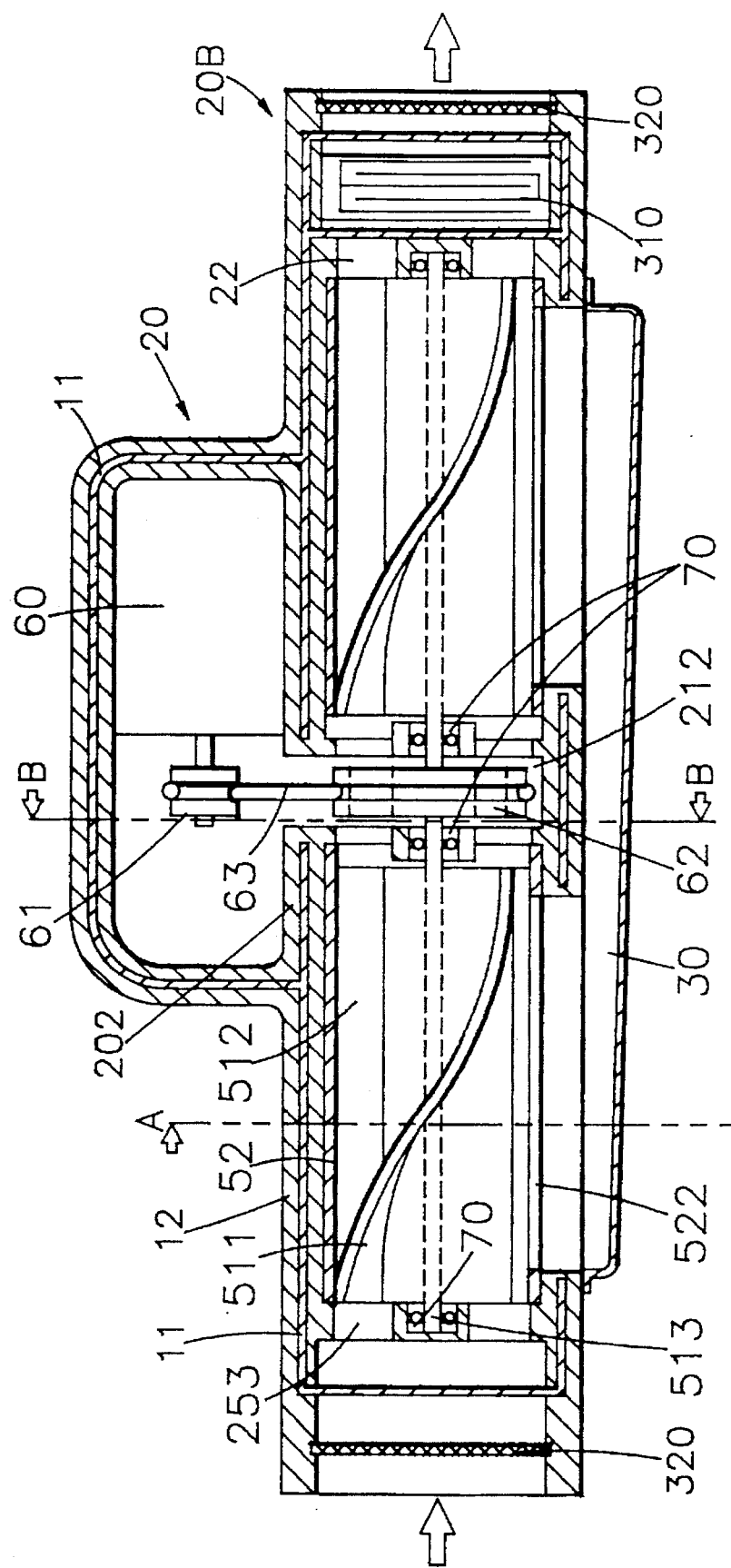
FIG. 2 shows a longitudinal sectional view of the gas cleaning device according to the present invention.
Figure 3:
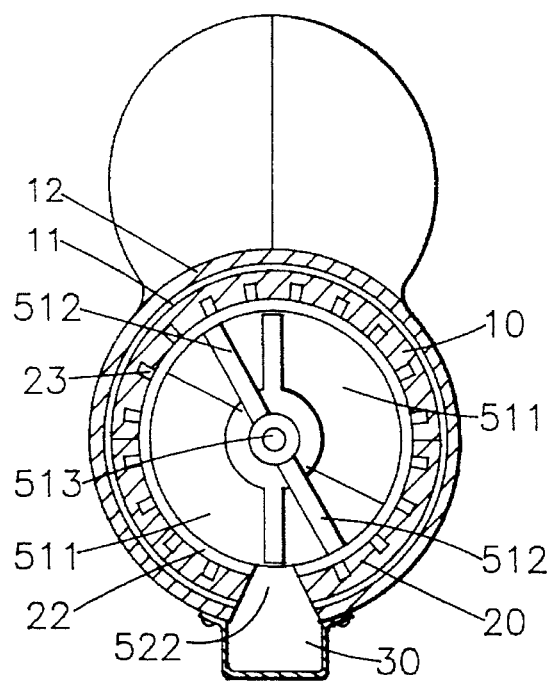
FIG. 3 shows a cross-sectional view of the gas cleaning device taken along line A—A of FIG. 2.
Figure 4:
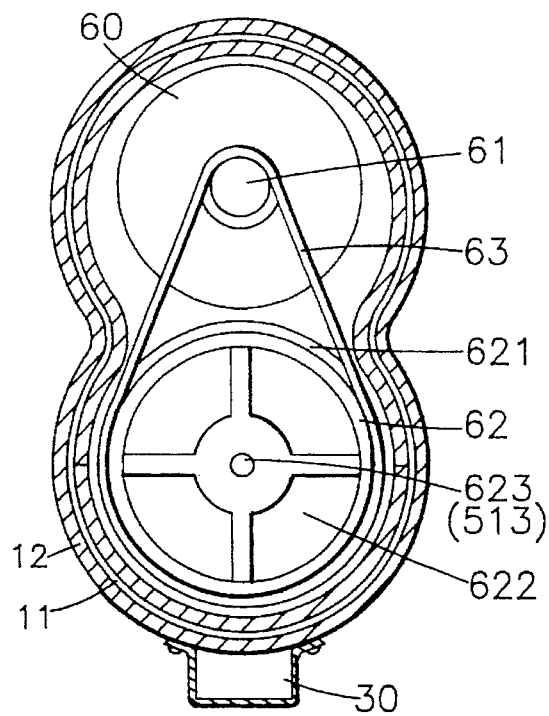
FIG. 4 shows a cross-sectional view of the gas cleaning device taken along line B—B of FIG. 2.
Figure 5:
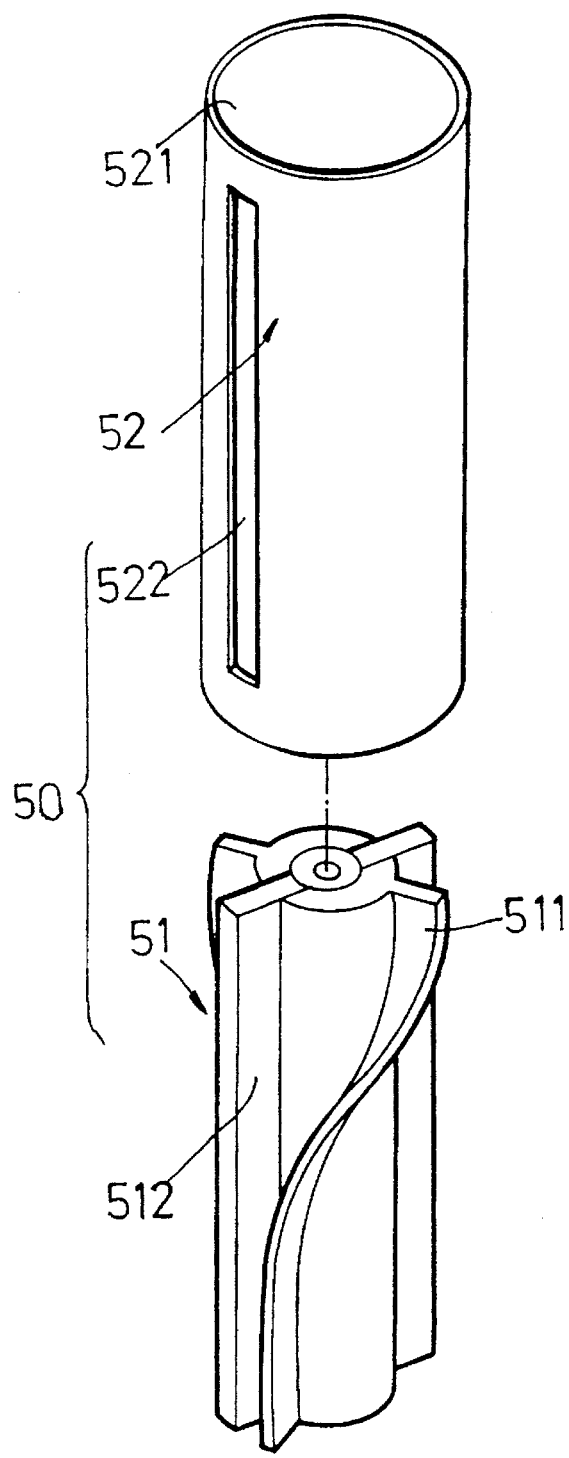
FIGS. 5–6 are exploded perspective drawings showing the assembly of a scraping knife employed in the gas cleaning device according to the present invention.
Figure 6:
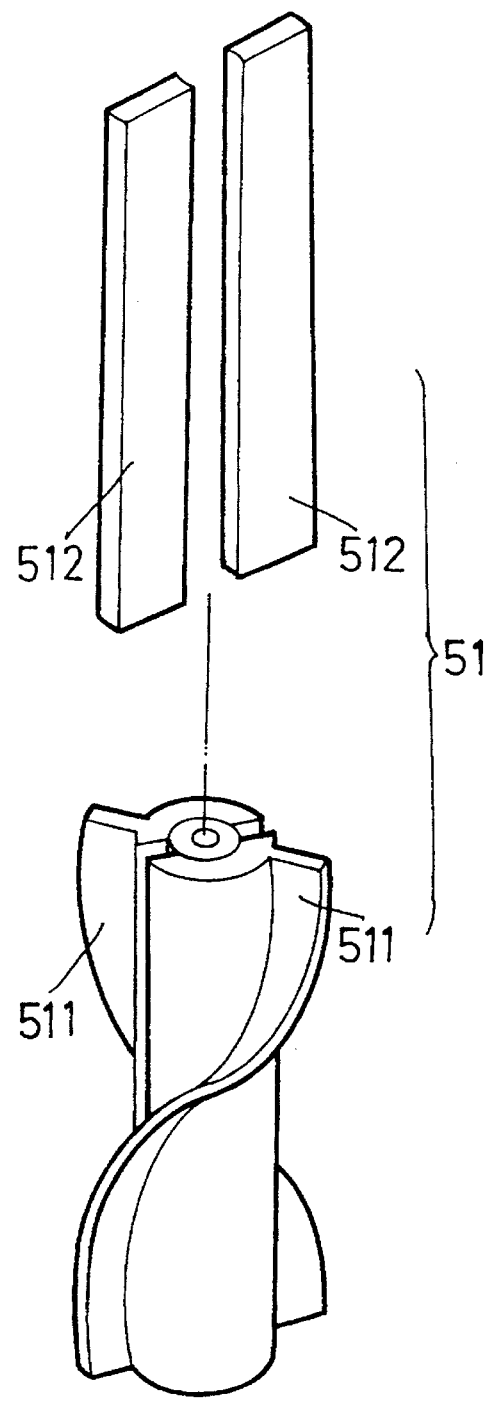

Referring to FIGS. 1–6, the first preferred embodiment of the present invention is composed of a conductive cylindrical body 52 of the exhaust gas cleaning device 50 coupled to the cathode of the static-electricity generator 50A and a rotatory cleaning unit 51 provided within the cylindrical body 52. As shown in FIGS. 5 and 6, the rotatory cleaning unit 51 includes a pair of spiral blades 511 and a pair removable scraping knife 512 provided longitudinally along the center shaft. As shown in FIGS. 1 and 2, a conductive shaft 513 is provided through the center of the spiral blade 511 and coupled to the anode of the static-electricity generator 50A. The conductive shaft 513 is supported by the bearings 70 and which is driven to rotate by the motor 60 via the small pulley 61, the belt 63, and the large pulley 62. When a stream of exhaust gas passes through the cylindrical body 52, since the cylindrical body 52 is coupled to the cathode of the static-electricity generator 50 and the center shaft 513 of the spiral blades 511 and the scraping knife 512 to the anode, the contained particles of exhaust gas are ionized and thereby are attracted by and deposited to the inner wall of the cylindrical body 52. By means of the rotation of the spiral blades 511, the exhaust gas is sucked to the rear end. During this process, the mass of deposited particles on the inner wall of the cylindrical body 52 can be removed by the scraping knifes 512. The removed deposition then drops through the opening 522 into the collecting chamber 30. Before the draining, the cleaned gas can then be further filtered by passing through the deodorizing device 310 and the protective screen 320.

The exhaust gas cleaning according to the present invention can be connected in plurality in series and connected in parallel to the static-electricity generator 50A. This allows the cleaning process to be carried out several times in sequence such that escaping particles in the previous device can be captured in the next. In this arrangement, the two processes of particle depositing and scraping in each device can be carried out alternately at fixed intervals so that at the same time one device carrying out the depositing process while the next device is carrying out the scraping process. This allows the gas cleaning process to be more efficient and the drained gas more environment-friendly.

FIG. 8 shows the second preferred embodiment of the present invention, in which a solenoid 85 is provided at the top of the casing and three cleaning units 80 coupled with a shaft 84 are provided in the cylindrical body 82. The transmission shaft 851 of the solenoid 85 has its one end engaged with a pivotal bar 86, whose both ends are each provided with an extended opening 861 for engagement by screw 862. The other end of the pivotal bar 86 is engaged with the shaft 84 of the cleaning unit 80 by another screw 862. A pivot 87 is provided near the extended opening 861 at the top and an extended groove 821 is provided on the cylindrical body 82 for the movement of the pivotal bar 86. By this arrangement, when the shaft 851 of the solenoid 85 moves to the left, the pivotal bar 86 brings the three cleaning units 80 to move to the right. In the mechanism, the first cleaning unit 80 is provided with a movable wheel 90 inside the draining hole 822. When the exhaust gas is in the second or third cleaning device, the amount of particles is significantly reduced. Therefore, the cleaning process can be carried out solely by the cleaning unit 80. The shaft 84 passes through the wheel 90 to be coupled with other cleaning units 80. As shown in FIGS. 7A and 7B, a plurality of teeth 83 are provided on the cleaning device, which are in match with the teeth 93A, 93B provided on the wheel 90. When the solenoid 85 drives the pivotal bar 86 to move the cleaning unit 80 to the top of the draining hole 822, the right side of the teeth 83 comes into match with the left side of the teeth 93A on the wheel 90. The wheel 90 is thereby brought to rotate and scrapes off the deposition of particles to be collected in the collecting chamber 30. The cleaned gas can pass a deodorizing device 310 to remove its smell. A fan 330 is provided at the rear of the deodorizing device 310 to suck the gas outwards.

FIG. 9 shows the third preferred embodiment of the present invention, in which four reciprocating cleaning units 80 are arranged. This embodiment allows the cleaning of the exhaust gas to be more efficient. The deodorizing device 310 and the fan 330 can be eliminated in this embodiment. The structure of the solenoid and the cleaning device are the same as in the second embodiment so description thereof will not be repeated.

In the third embodiment, the exhaust gas can be cleaned intensively in the first and second cleaning device. Therefore, only one reciprocating cleaning device is installed each on the third and fourth cylindrical body 82. The pivotal bar 86 driven by the solenoid 85 has its one end fixed to the shaft 84 on the third cleaning device. An extended opening 821 is provided on the casing to allow the movement of the pivotal bar 86. A cover 871 is provided on the pivotal bar 86, which can completely cover the extended opening 821 during the movement of the pivotal bar 86 so as to prevent smoke particles from escaping to the outside environment. The cover 871 is provided on an opening 872. When the pivotal bar 86 moves reciprocally, the cover 871 also moves reciprocally in the horizontal direction. After this cleaning process, the cleaned gas can be further deodorized by passing it through the deodorizing device.

In a further preferred embodiment, the wheel 90 can be made to be driven the reciprocal movement of the cleaning unit 80 rotates by a certain angle. This provision allows the job of draining the smoke particles deposited on the wheel 90 into the collecting chamber to be more efficient. To achieve this, the shaft connecting the cleaning unit 80 and the wheel 90 is made into several pairs (at least two) of matched teeth, as shown in FIGS. 7A–7B. The teeth on the cleaning device are in match with those on the wheel, so they can be engaged to transmit the rotation to the wheel.

Referring to FIGS. 10A–10C, the cleaning units 80A, 80B are fixed at the opposite ends of a shaft 84. Assume that the maximum displacement of the cleaning device in the reciprocal movement is D. During the operation, the distance between the first cleaning unit 80A and the wheel 90 decreases rapidly from D to zero while the distance between the second cleaning device increases from zero to D. The right side 83A of the teeth on the first cleaning unit 80A thereby rapidly comes into match with the left side 93A of the teeth on the shaft 90. This rapid contact will cause the wheel 90 to rotate in the counterclockwise direction by a degree of 90° (see the change of position of the peaks 91, 92 of the teeth in FIGS. 10A and 10B). Similarly, when the first cleaning unit 80A displaces to the left for a distance of D, the second cleaning unit 80B is rapidly displaced to the left for the same distance D. This sudden touch also causes the left side 83B of the teeth on the second cleaning device to come into match with the right side 93B of the teeth on the wheel 90. The wheel 90 thereby is driven to rotate further in the counterclockwise direction for another 90°. It can be learned from the change of positions of the peaks of the teeth shown in FIGS. 10A–10C that the reciprocal motion of any of the first and second cleaning units 80A, 80B can drive the wheel 90 to rotate by 180°. The wheel 90 therefore can rotate in 360° so as to scrape off the deposition of smoke particles thereon and drain it to the collecting chamber 30.

FIG. 11 shows the circuit block diagram of the control system employed in the exhaust gas cleaning device according to the present invention. The power supply is a DC power source 400, which supplies power via a switch 402, an overload protector 401, and an voltage booster 403 to the static-electricity generator 50A. As mentioned earlier, the anode of the static-electricity generator 50A is connected to the shafts 513 in the cleaning device and the cathode is connected to the cylindrical bodies 52, 82. The power source also supplies power to the deodorizing device 310. A timer 601 governs the operation of the motor 60 or the solenoid 85. If the concentration of exhaust gas is low, the motor or the solenoid don't have to operate in their maximum effort; the cleaning units can be operated in shift so as to prolong the life of use of the exhaust gas cleaning device.

FIGS. 12–14 show the fourth preferred embodiment of the present invention. This embodiment is substantially the same in structure as the embodiment shown in FIGS. 8 and 9, except that the previous embodiment is to be employed on a single-pipe exhaust system and this embodiment is to be employed on a two-pipe exhaust system. The embodiment, however, utilizes only one solenoid 85 for the driving and the pivotal bar 86 is provided in pair connected to the shaft 84 of the cleaning unit.

When the exhaust gas cleaning device according to the present invention is installed at the outlet of the exhaust pipe on a car, it is not necessary to let the device come into tight coupling with the outlet. In fact, a section can be left between them, which can contribute to the heat-dissipation and also allow the wind to help increase the efficiency of cleaning the exhaust gas. In the case the rear end of the car has no room for installing the cleaning device, an angled pipe can be attached thereto and connected in the other end with the cleaning device.

The present invention has been described hitherto with exemplary preferred embodiments. However, it is to be understood that the scope of the present invention need not be limited to the disclosed preferred embodiments. On the contrary, it is intended to cover various modifications and similar arrangements within the scope defined in the following appended claims. The scope of the claims should be accorded the broadest interpretation so as to encompass all such modifications and similar arrangements.

What is claimed is:

1. An exhaust gas cleaning device comprising:
    a) a first half part and a second half part which are combined to form a cleaning body, said cleaning body including a top portion and a bottom portion thereof;
    b) a conductive cylindrical body positioned in said bottom portion of said cleaning body, exhaust gas passes through said conductive cylindrical body;
    c) a movable shaft installed at a center of said conductive cylindrical body, said shaft also being conductive;
    d) a shaft driving means positioned in said top portion of said cleaning body;
    e) a set of blades on said shaft, said blades act as a fan to force exhaust gas through said conductive cylindrical body;
    f) a static-electric generator having a first pole connected to said cylindrical body and a second pole connected to said shaft, thereby creating an electric field between said conductive cylindrical body and said shaft so that said electric field ionizes smoke particles in the exhaust gas and causes said smoke particles to be deposited on an inner wall of said cylindrical body;
    g) a cleaning device provided on said shaft including means to remove said smoke particles from said inner wall; and
    h) a static-electricity shield connected to a common ground.

2. The exhaust cleaning device of claim 1 wherein:
    a collecting chamber is provided under said cleaning body in communication with an interior of said conductive cylindrical body, said collecting chamber collects said smoke particles removed by said cleaning device.

3. The exhaust cleaning device of claim 1 wherein: a deodorizing device is included to remove odorants from said exhaust gas.

4. The exhaust cleaning device of claim 1 wherein:
    said driving means is a driving motor.

5. The exhaust cleaning device of claim 1 wherein:
    said cleaning device is a scraping knife longitudinally affixed to said shaft, said knife having a scraping edge that scrapes said inner wall of said conductive cylindrical body when said shaft is rotated.

6. The exhaust cleaning device of claim 1 wherein:
    said driving means is a solenoid.

7. The exhaust cleaning device of claim 6 wherein:
    said cleaning device is a reciprocating unit in said conductive cylindrical body and is driven by said solenoid.

8. The exhaust cleaning device of claim 1 wherein:
    said cleaning device includes at least one reciprocating unit coupled with said shaft and at least one rotatable wheel means mounted on said shaft,
    said driving means is a solenoid with a transmission shaft including a first end that is engaged with a first end of a pivotal bar, each end of said bar includes an extended opening to receive a screw, a second end of said pivotal bar is engaged with said shaft of said cleaning device,
    a pivot is provided near said first end of said pivotal bar; whereby
    when said transmission shaft of said solenoid moves to the left, said pivotal bar moves said cleaning device to the right, and when said transmission shaft of said solenoid moves to the right, said pivotal bar moves said cleaning device to the left.

9. The exhaust cleaning device of claim 8 wherein:
    said reciprocating unit periodically engages said rotatable wheel means, said rotatable wheel is rotated a fixed angle during each said engagement with said reciprocating unit.

10. The exhaust cleaning device of claim 6 wherein:
    a deodorizing device is included.

11. The exhaust cleaning device of claim 10 wherein:
    a fan is provided at a rear end of said deodorizing device.

12. The exhaust cleaning device of claim 1 wherein:
    a second conductive cylindrical body is installed in parallel with said conductive cylindrical body.

\* \* \* \* \*